(12) United States Patent
Hasegawa et al.

(10) Patent No.: US 10,372,674 B2
(45) Date of Patent: Aug. 6, 2019

(54) FILE MANAGEMENT IN A STORAGE SYSTEM

(71) Applicant: International Business Machines Corporation, Armonk, NY (US)

(72) Inventors: Tohru Hasegawa, Tokyo (JP); Sosuke Matsui, Tokyo (JP); Shinsuke Mitsuma, Tokyo (JP); Tsuyoshi Miyamura, Kanagawa (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 14/884,889

(22) Filed: Oct. 16, 2015

(65) Prior Publication Data

US 2017/0109364 A1 Apr. 20, 2017

(51) Int. Cl.
*G06F 17/30* (2006.01)
*G06F 16/13* (2019.01)
*G06F 16/174* (2019.01)
*G06F 16/11* (2019.01)

(52) U.S. Cl.
CPC .......... *G06F 16/137* (2019.01); *G06F 16/122* (2019.01); *G06F 16/1748* (2019.01)

(58) Field of Classification Search
CPC ......... G06F 17/30097; G06F 17/30156; G06F 16/13; G06F 16/137; G06F 16/164; G06F 16/166
See application file for complete search history.

(56) References Cited

U.S. PATENT DOCUMENTS

| 7,412,449 | B2* | 8/2008 | Both ................. G06F 17/30097 |
| | | | 707/999.007 |
| 8,572,055 | B1 | 10/2013 | Wu et al. |
| 8,706,703 | B2 | 4/2014 | Factor et al. |
| 8,719,240 | B2 | 5/2014 | Bates et al. |
| 9,268,784 | B1* | 2/2016 | Guo ................. G06F 17/30156 |
| 9,830,111 | B1* | 11/2017 | Patiejunas ............ G06F 3/0625 |
| 9,959,280 | B1* | 5/2018 | Whitehead ........... G06F 16/162 |
| 2004/0133577 | A1* | 7/2004 | Miloushev .............. G06F 16/16 |
| | | | 707/999.01 |

(Continued)

OTHER PUBLICATIONS

Meister et al., "A Study on Data Deduplication in HPC Storage Systems", SC12, Nov. 10-16, 2012, Salt Lake City, Utah, © 2012, IEEE, 11 pages.

(Continued)

*Primary Examiner* — Ashish Thomas
*Assistant Examiner* — Jedidiah P Ferrer
(74) *Attorney, Agent, or Firm* — Stephanie L. Carusillo

(57) ABSTRACT

In an approach to determining a storage to which to store a file in a storage system including at least one server and at least two storages which can communicate with the at least one server through a communication network, a computer obtains a file name of a file to be stored in a storage. The computer determines an effect of deduplication of data of the file based on the file name, and responsive to determining the effect of deduplication exists, selects a part of the file name. The computer then calculates a hash value using the part of the file name and determines a storage to which to store the file based on the hash value.

16 Claims, 7 Drawing Sheets

(56) References Cited

U.S. PATENT DOCUMENTS

| | | | |
|---|---|---|---|
| 2009/0164440 A1* | 6/2009 | Pudipeddi | G06F 17/30097 |
| | | | 707/999.003 |
| 2011/0047417 A1* | 2/2011 | Malnati | G06F 11/0727 |
| | | | 714/49 |
| 2011/0099351 A1* | 4/2011 | Condict | G06F 16/1752 |
| | | | 711/216 |
| 2013/0041872 A1 | 2/2013 | Aizman et al. | |
| 2013/0138902 A1* | 5/2013 | Haustein | G06F 11/1453 |
| | | | 711/162 |
| 2013/0232124 A1 | 9/2013 | Gaither | |
| 2014/0067776 A1* | 3/2014 | Larson | G06F 17/30156 |
| | | | 707/692 |
| 2015/0199367 A1* | 7/2015 | Hammer | G06F 17/30085 |
| | | | 707/654 |
| 2015/0213032 A1* | 7/2015 | Powell | G06F 17/30079 |
| | | | 707/827 |
| 2015/0378614 A1* | 12/2015 | Hayasaka | G06F 17/30156 |
| | | | 711/162 |

OTHER PUBLICATIONS

Tolia et al., "Opportunistic Use of Content Addressable Storage for Distributed File Systems", Proceedings USENIX Annual Technical Conference, Printed on: Sep. 11, 2015, General Track 2003: 127-140, San Antonio, TX, 14 pages.

"Locality-sensitive hashing", From Wikipedia, the free encyclopedia, last modified on Jul. 31, 2015, at 12:20, printed on Aug. 27, 2015, at 16:35, 5 pages, <https://en.wikipedia.org/wiki/Locality-sensitive_hashing>.

\* cited by examiner

| Hash value | 0x01 | 0x02 | 0x03 | 0x04 |
|---|---|---|---|---|
| Ring1 | storage1 | storage2 | storage3 | storage4 |
| Ring2 | storage2 | storage3 | storage4 | storage1 |
| Ring3 | storage3 | storage4 | storage1 | storage2 |

FIG. 8

FILE MANAGEMENT IN A STORAGE SYSTEM

BACKGROUND OF THE INVENTION

The present invention relates to file management in a storage system, and more specifically, to a method for deciding a storage to which to store a file in the storage system.

Distributed object storage is commonly used as a platform of cloud storage services. Storing data in the distributed object storage enables scalable storage with respect to the increase in data amount. Known distributed object storage, such as Swift by OpenStack® and Ceph by Inktank®, inputs a file name to a hash function such as MD5 and then determines the storage where the file is to be stored based on the resulting hash value. This method enables all the storages to be used roughly equally.

In order to address the increase in data amount in recent years, storage having a deduplication function of data is increasingly being used. The deduplication function allows duplicated data areas to be shared between a plurality of files, thereby reducing the required storage spaces.

Since the distributed object storage determines the storage where a file is to be stored based on its file name, a plurality of files that have duplicated data may be stored in different storages. For example, the known distributed object storage methods input a file name to a hash function such as MD5 and then determines the location where the file is to be stored based on the output of the hash function.

FIG. 1 shows a configuration example 100 of a known distributed object storage having a deduplication function. In FIG. 1, in the network (cloud) 1, two proxy nodes 1, 2 and two storage nodes 1, 2 are connected so that communication is possible via network 1. A proxy node is a node that determines the location where a file is to be stored. Each storage node has a plurality of storages (corresponding to the storages 1-4 in FIG. 1) and the deduplication function operates independently for each storage node 1, 2 or storage 1, 2, 3, 4. That is, the deduplication function operates independently for storage node 1 and storage node 2, or operates independently for storage 1, storage 2, storage 3, and storage 4. At this time, the duplicate data stored by same storage node or storage is eliminated. However, the required storage spaces cannot be suitably reduced because deduplication cannot be performed between different storage nodes or storages.

A method may be considered that uses file data instead of file name as an input and applies, for example, locality sensitive hashing to the input to determine the storage where the file is to be stored. This method allows a plurality of files that have similar data to be stored in the same storage and may achieve highly effective deduplication. However, this method still has the following problems.

Since the location where a file is to be stored is determined based on its file data instead of its file name, when a file write request occurs from a client, a proxy node has to retain the file data until the location where the file is to be stored is determined. The resources of the proxy node are consumed depending on the size of the file and the number of file write requests. Although effective deduplication can be achieved by storing files that have similar data in the same storage, the usage of storages may become unequal.

SUMMARY OF THE INVENTION

The present invention provides a method for determining a storage to which to store a file in a storage system including at least one server and at least two storages which can communicate with the at least one server through a communication network. The method includes, performing by a computer, the steps of obtaining a file name of a file to be stored in a storage, determining an effect of deduplication of data of the file based on the file name, and responsive to determining the effect of deduplication exists, selecting a part of the file name. The method includes calculating a hash value using the part of the file name and determining a storage to which to store the file based on the hash value.

The present invention further provides a storage system comprising at least one server and at least two storages which can communicate with the at least one server through a communication network. The server determines a storage to which to store a file in response to a write request of the file from a client by performing the steps of obtaining a file name of a file to be stored in a storage, determining an effect of deduplication of data of the file based on the file name, and, responsive to determining the effect of deduplication exists, selecting a part of the file name if the effect of deduplication being recognized. The server further performs the steps of calculating a hash value using the part of the file name and determining a storage to which to store the file based on the hash value.

The present invention further provides a computer program product for determining a storage to which to store a file in a storage system including at least one server and at least two storages which can communicate with the at least one server through a communication network, the computer program product comprising one or more computer readable storage devices, and program instructions stored on the one or more computer readable storage devices, the stored program instructions including program instructions to obtain a file name of a file to be stored in a storage, determine an effect of deduplication of data of the file based on the file name, and, responsive to determining the effect of deduplication exists, to select a part of the file name. The program instruction further calculate a hash value using the part of the file name, and determine a storage to which to store the file based on the hash value.

BRIEF DESCRIPTION OF THE DRAWING

FIG. 8 is a table showing a relationship between hash values and storages where the file is to be stored, in accordance with one embodiment of the present invention.

DETAILED DESCRIPTION

Figure 1:
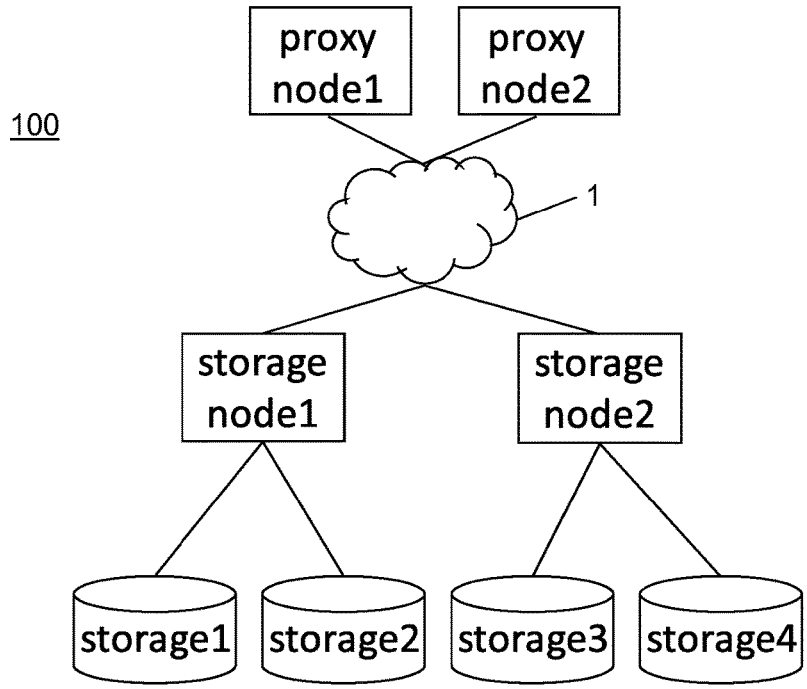
FIG. 1 is a configuration example of a conventional distributed object storage.
Figure 2:
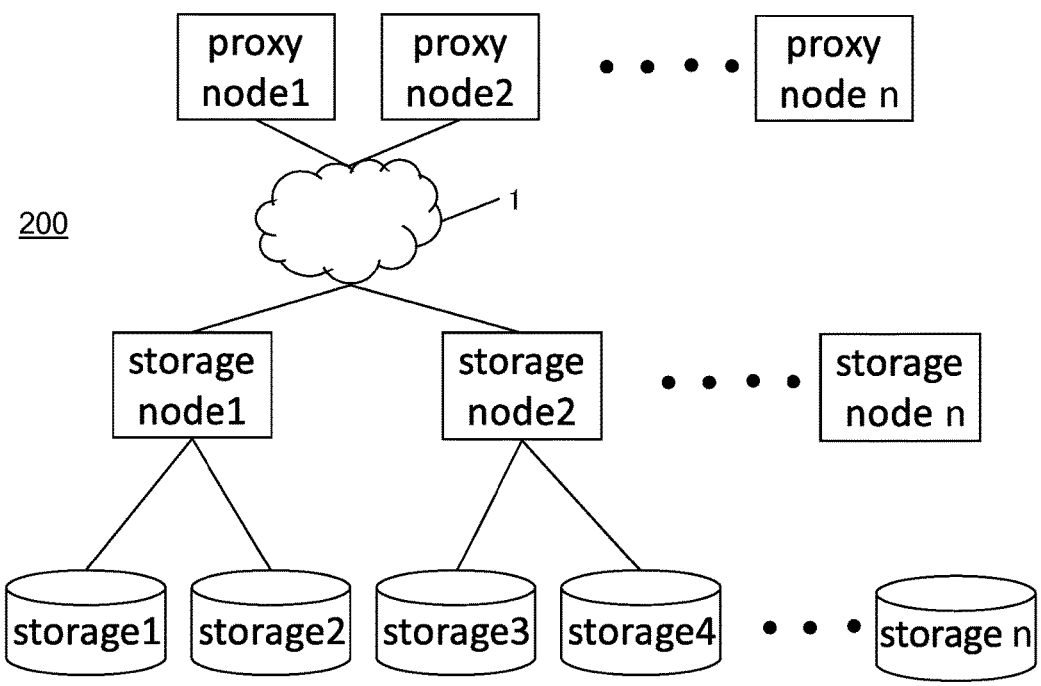
FIG. 2 is a diagram showing a configuration example of a storage system, in accordance with one embodiment of the present invention.

The following is an explanation of one embodiment of the present invention with reference to the drawings. FIG. 2 is a diagram showing a configuration example of a distributed object storage system 200 of one embodiment of the present invention. An embodiment of the present invention is explained below using the configuration of the distributed object storage shown in FIG. 2. In addition, FIG. 2 shows an example using known methods as the distributed object storage system 200, and the present invention can also be used by other distributed object storage.

In FIG. 2, in the network (cloud) 1, a plurality of proxy nodes 1-n and a plurality of storage nodes 1-n are connected so that communication is possible via network 1. Each of proxy node 1-n and storage node 1-n is hardware such as a computer or server which can perform a plurality of software. Components of proxy node 1-n are depicted and described further with reference to FIG. 10. The proxy node is a node that determines the storage where the file is to be stored. Each storage node 1-n has a plurality of storages 1-n and manages the storages. The storages 1-n can contain arbitrary storage units, such as HDD, tape drive, and SSD.

Figure 3:
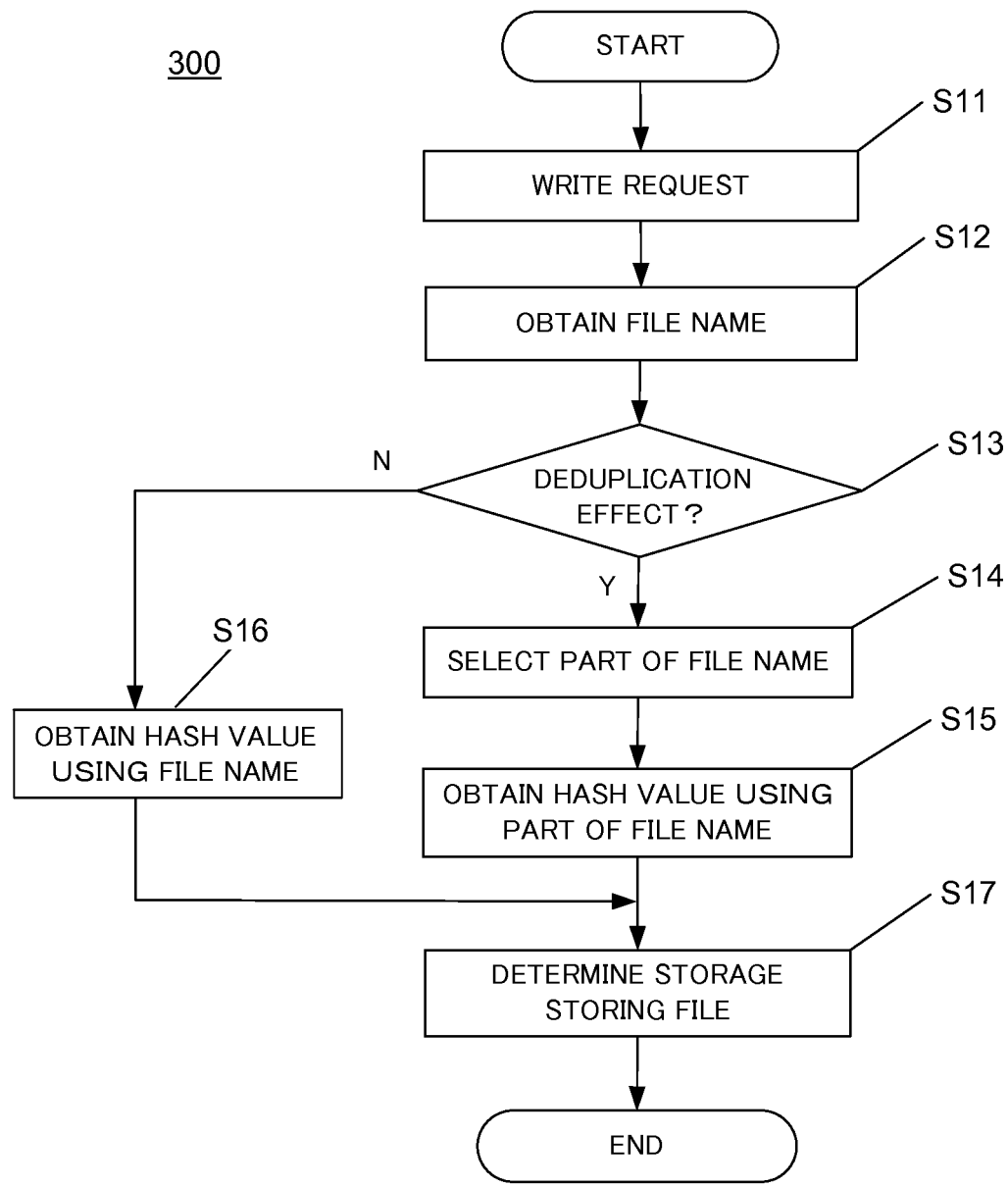
FIG. 3 is a chart showing a flow of a method, in accordance with one embodiment of the present invention.

FIG. 3 is a chart 300 showing a flow of a method of one embodiment of the present invention. In the distributed object storage system 200 of FIG. 2 mentioned above, the flow of FIG. 3 is carried out, when one of the proxy nodes 1-n performs predetermined software. That is, the execution of each step of the flow is performed using the predetermined software and hardware (proxy node) in the distributed object storage system 200 of FIG. 2. Each step of the flow of FIG. 3 is explained below, referring to FIG. 4-FIG. 9.

In step S11 of FIG. 3, a file write request occurs from a client. In step S12, a proxy node that determines the location (storage node or storage) where the file is to be stored obtains its file name. For example, as shown in FIG. 4, the proxy node 1 obtains four file names of "RHEL5.4.qcow2", "RHEL5.5.qcow2", "RHEL6.4.qcow2", and "RHEL6.5.qcow2" in the region 2.

In decision step S13 of FIG. 3, the proxy node 1 determines the effect of deduplication of data of the file based on the file name obtained in the step S12. Specifically, the proxy node 1 first compares the file name to information of file names registered in a filter. The information of file names in the filter has been selected as information which has high possibility that duplication of data may take place. In embodiments of the present invention, the filter is a pre-defined filter, and the determination as to whether to apply the method of the invention to the file to be written is determined by referring to the pre-defined filter. In embodiments of the present invention, the filter is provided for determining whether or not effective deduplication may be achieved. In the result of the comparison, if the file name contains the same part of the information of file names registered in a filter (decision step S13, "yes"" branch), the proxy node 1 determines that the effect of deduplication exists (is recognized) and proceeds to step S14.

Figure 4:
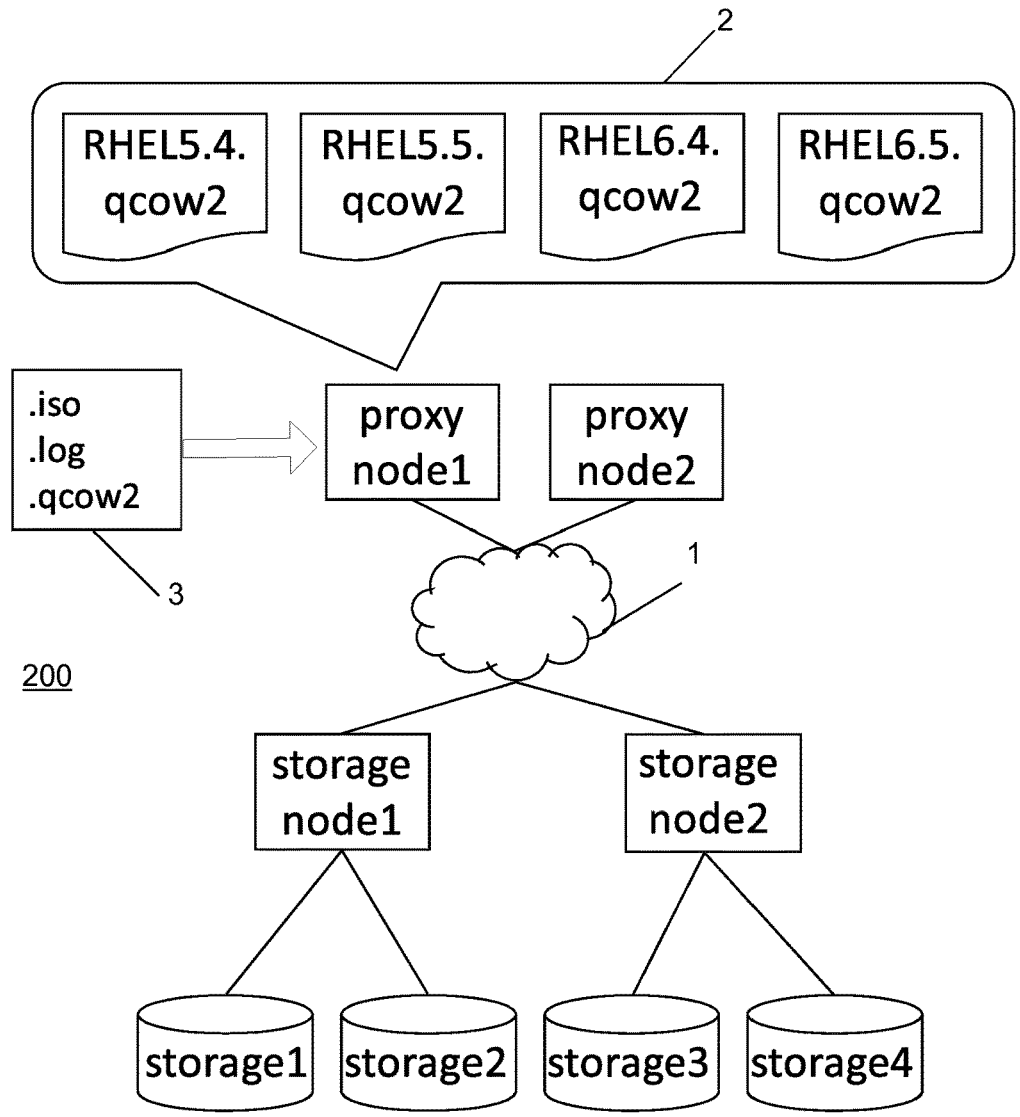
FIG. 4 is a diagram for explaining each of the steps of the method, in accordance with one embodiment of the present invention.

For example, as shown in FIG. 4, the proxy node 1 refers to the filter 3 defined in advance, and compares the extensions contained in the file names in the region 2 with extensions (".iso", ".log", ".qcow2") in the filter 3, which may be registered with the filter 3 beforehand. The extensions (".iso", ".log", ".qcow2") in the filter 3 has been selected as information which has high possibility that duplication of data may take place. The filter 3 can include an extension of a file, the first several characters of a file name, a header of a file, and an absolute path of a parent directory of a file for example. In the result of the comparison, if the file name contains one of the extensions (".iso", ".log", ".qcow2") in the filter 3, the proxy node 1 determines that the effect of deduplication exists (is recognized). In FIG. 4, each of the four file names of "RHEL5.4.qcow2", "RHEL5.5.qcow2", "RHEL6.4.qcow2" and "RHEL6.5.qcow2" in the region 2 includes the extension of ".qcow2" in the filter 3. Therefore, the proxy node 1 determines that the effect of deduplication of data exists (is recognized) about the files which have the file names in the region 2.

Figure 5:
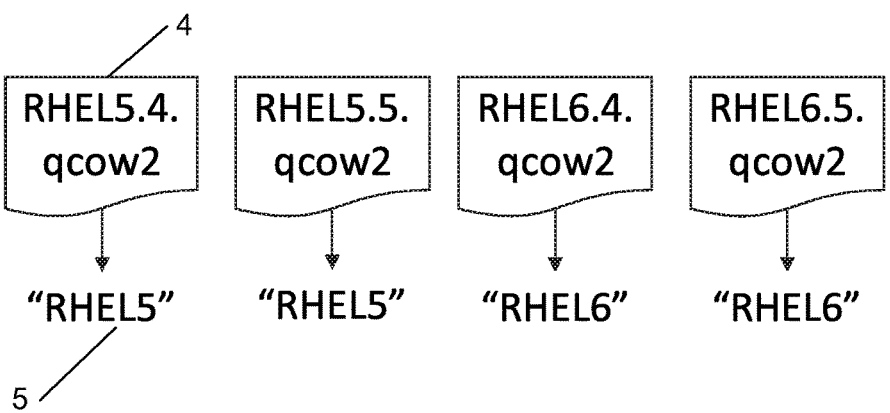
FIG. 5 is a diagram for explaining each of the steps of the method, in accordance with one embodiment of the present invention.

If the effect of deduplication exists in decision step S13, in next step S14, the proxy node 1 selects a part of each of the file names. The part of each of the file names can include a character string, a number string or both a several character string and a number string in the file name. In the example of four extensions in region 2 of FIG. 4, for example as shown in FIG. 5, the character string 5 from the head of each of the file name extensions 4 to the first dot (".") is selected. That is, "RHEL5", "RHEL5", "RHEL6", or "RHEL6" is selected from each of the file names as shown in FIG. 5.

The rules for the selection (cut-out) are defined by an administrator beforehand. For example, if it is known that the file name of image files of a certain virtual machine is named according to the naming convention: delimit the prefix, major number, minor number, date, and extension with "." (for example, "RHEL6.0-20101004.qcow2"), the rule "for the files having a file name begin with 'RHEL,' select (cut) characters from the head to the first '.' out of their file name (i.e., the files having a file name of which the first characters from its head to the first '.' are the same are stored in the same storage)" may be defined to use storages equally to some extent.

When the length of the part (character string) cut out (selected) from the file name is short, the file with the part of the file name tends to be stored by the same storage. That is, the exclusion effect of duplication storage is large. However, distribution storage of the files, in other words, the homogeneity of the amount of the storage used becomes low. On the contrary, when the length of the part (character string) cut out (selected) from the file name is long, the same storage is hard to be stored. That is, the exclusion effect of duplication storage is small. However, distribution storage of the files, in other words, the homogeneity of the amount of the storage used becomes high.

Allowing the length of a character string cut out (selected) from a file name to be adjusted gives the choice of prioritizing deduplication or equal usage of storages. In order to prioritize the enhancement of deduplication rate, all the characters except those representing the version (for example, "RHEL") may be cut out (selected) from the file name (for example, "RHEL6.0-20101004.iso"). By choosing to cut out (select) a character string in this manner, all the similar files are stored in a certain storage and therefore the deduplication function enables efficient usage of storage spaces.

Although the effectiveness of deduplication decreases, in order to prioritize equal usage of storages, only more similar files may be stored in the same storage by cutting (selecting) characters from the head to the major number out of the file name (for example, "RHEL6"). By choosing to cut out (select) a character string in this manner, the files having a different major number are stored in different storages, and therefore the storages are used more equally as compared to the case of cutting out all the characters except those represent the version.

The length of the character string cut out (selected) from the file name can be chosen/adjusted as follows, for example. Step 1: Select one storage node; Step 2: Investigate whether the selected storage node is used notably as compared with other storage nodes (for example, calculate the deviation score of the amount of the storage node used, and determine by size comparison with a threshold value); Step 3: When the amount of the storage node used is larger than other storage nodes, it generates the list of files stored in the storage node; Step 4: Find a file with the prefix determined as there being an effect of deduplication in the step S13 of FIG. 3 in the files written in the file list; Step 5: When two or more files in which the prefix is common are found, lengthen the length of a character string selected (cut out) from the head of the file name about those files; and Step 6: In order to attain equalization of the amount of the storage used, rearrange those files to another storage node/storage with an edit of the length of the character string to choose.

Figure 6:
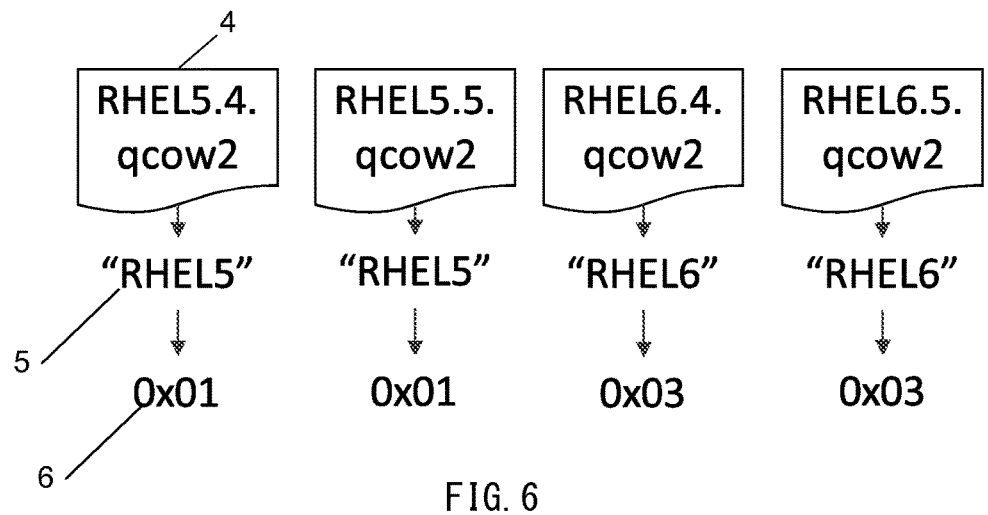
FIG. 6 is a diagram for explaining each of the steps of the method, in accordance with one embodiment of the present invention.

Referring to FIG. 3 again, in step S15, the proxy node 1 calculates a hash value using the part of the file name. Specifically, the selected character string is input to a hash function to obtain a hash value. In the example of the four extensions 4 of FIG. 5, for example as shown in FIG. 6, the four corresponding hash values 6, "0x01", "0x01", "0x03", and "0x03" are obtained from the selected character string 5, "RHEL5", "RHEL5", "RHEL6", and "RHEL6". In decision step S13, when it is determined that duplication storage does not take place easily, i.e., that deduplication does not exist (is not recognized) (decision step S13, "no" branch), in step S16, the proxy node 1 calculates a hash value using the file name. Specifically, all character strings of the file name is input to a hash function to obtain a hash value.

Figure 7:
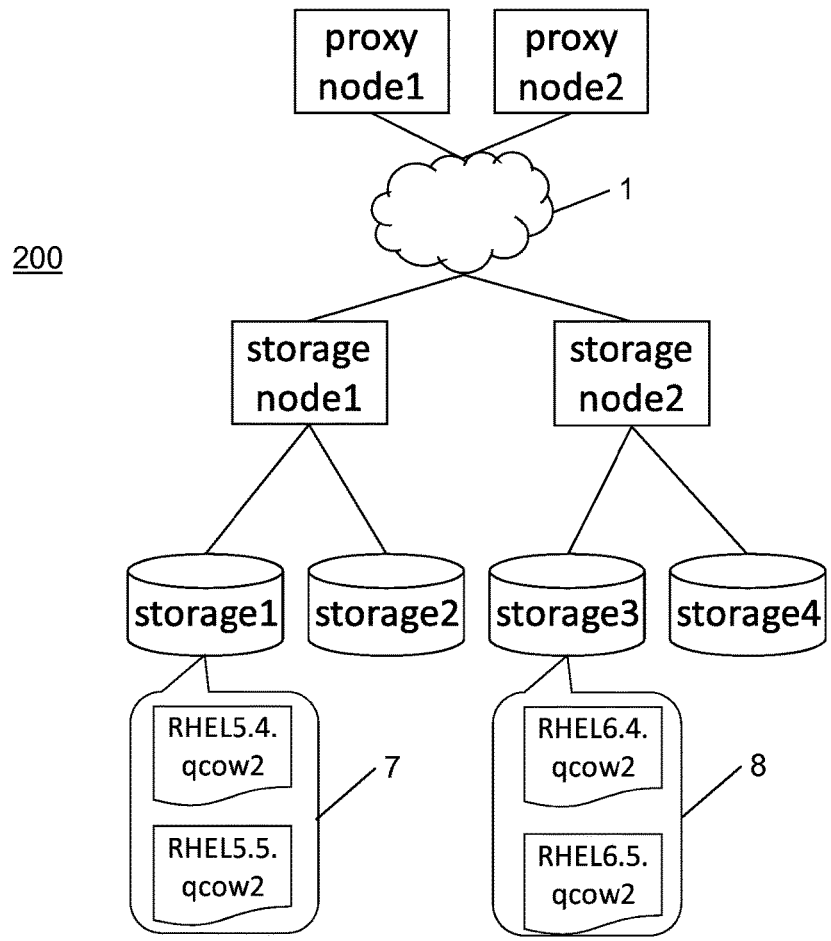
FIG. 7 is a diagram for explaining each of the steps of the method, in accordance with one embodiment of the present invention.

In step S17, the proxy node 1 determines a storage/storage node to store the file based on the hash value. In the decision, for example, in a known distribution storage, a table which defines a relationship between hash values and storages where the file is to be stored are referred to. In the case of the example of the four extensions 4 of FIG. 4, as shown in FIG. 7, the files 7 (RHEL5.4.qcow2, RHEL5.5.qcow2) having a hash value "0x01" are stored in storage 1. The files 8 (RHEL6.4.qcow2, RHEL6.5.qcow2) having hash value "0x03" are stored in storage 3.

By the above mentioned process (steps), a plurality of files having a file name of which the first several characters are the same are stored in the same storage. Since different versions of files have a similarity of 30-90%, one embodiment of the present invention allows storage spaces to be utilized efficiently by the deduplication function of storages.

Figure 9:
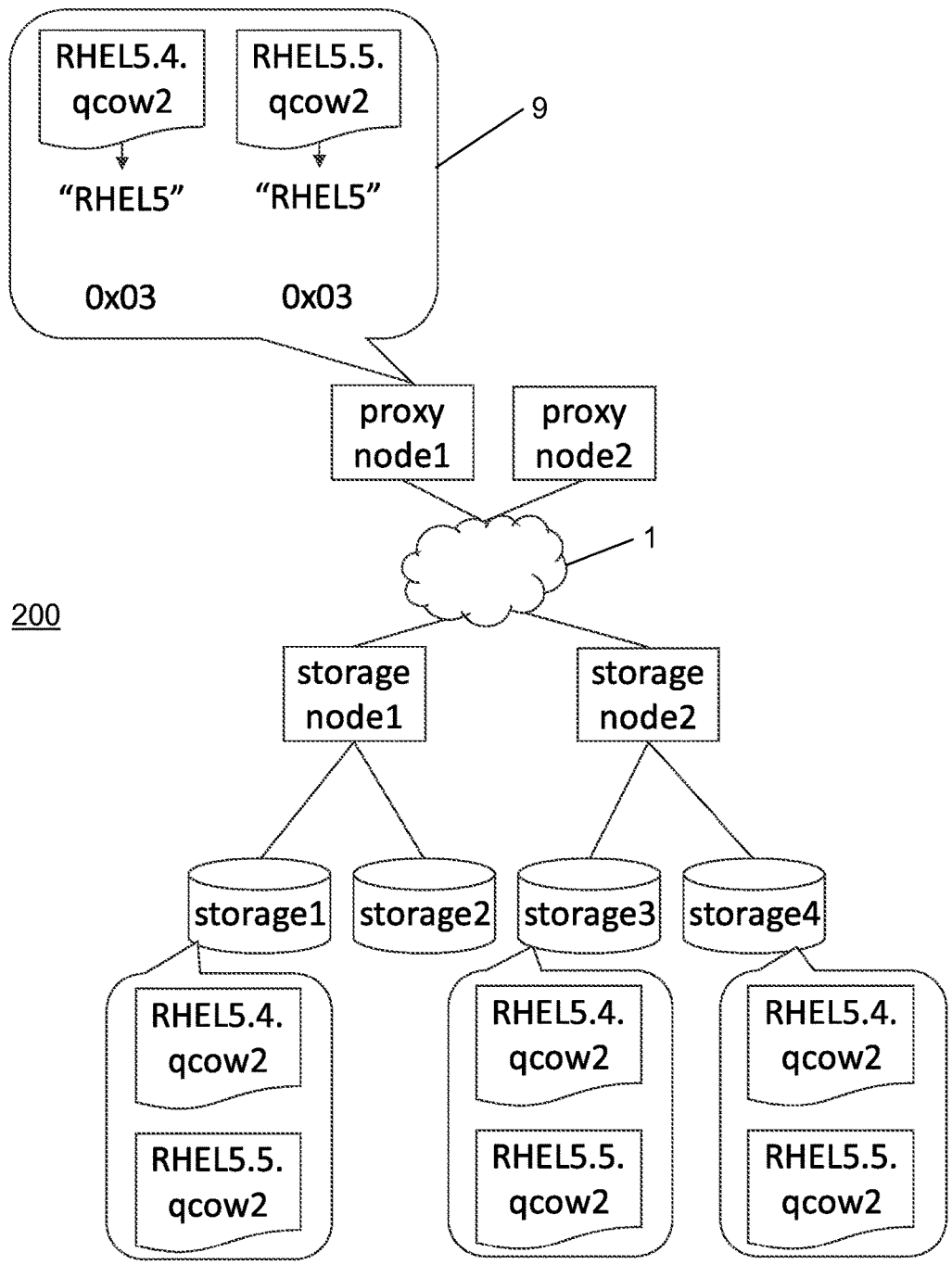
FIG. 9 is a diagram for explaining each of the steps of the method, in accordance with one embodiment of the present invention.

Known distributed object storage has a function of storing replications of a file in different storages to ensure data redundancy. As shown in FIG. 8, replications of the file can be stored in different storages by maintaining different kinds of Rings 1, 2, 3 in each of which a different storage corresponds to a certain hash value. For example, in hash value "0x03", storage 3 is chosen in Ring 1, storage 4 is chosen in Ring 2, and storage 1 is chosen by Ring 3, respectively. As shown in FIG. 9, by using the table, replications of different versions of files 9 (RHEL5.4.qcow2, RHEL5.5.qcow2, hash value "0x03") are stored in the same storage (storage 1, storage 3, or storage 4), and therefore the deduplication function enables efficient usage of storage spaces while data redundancy is ensured.

Figure 10:
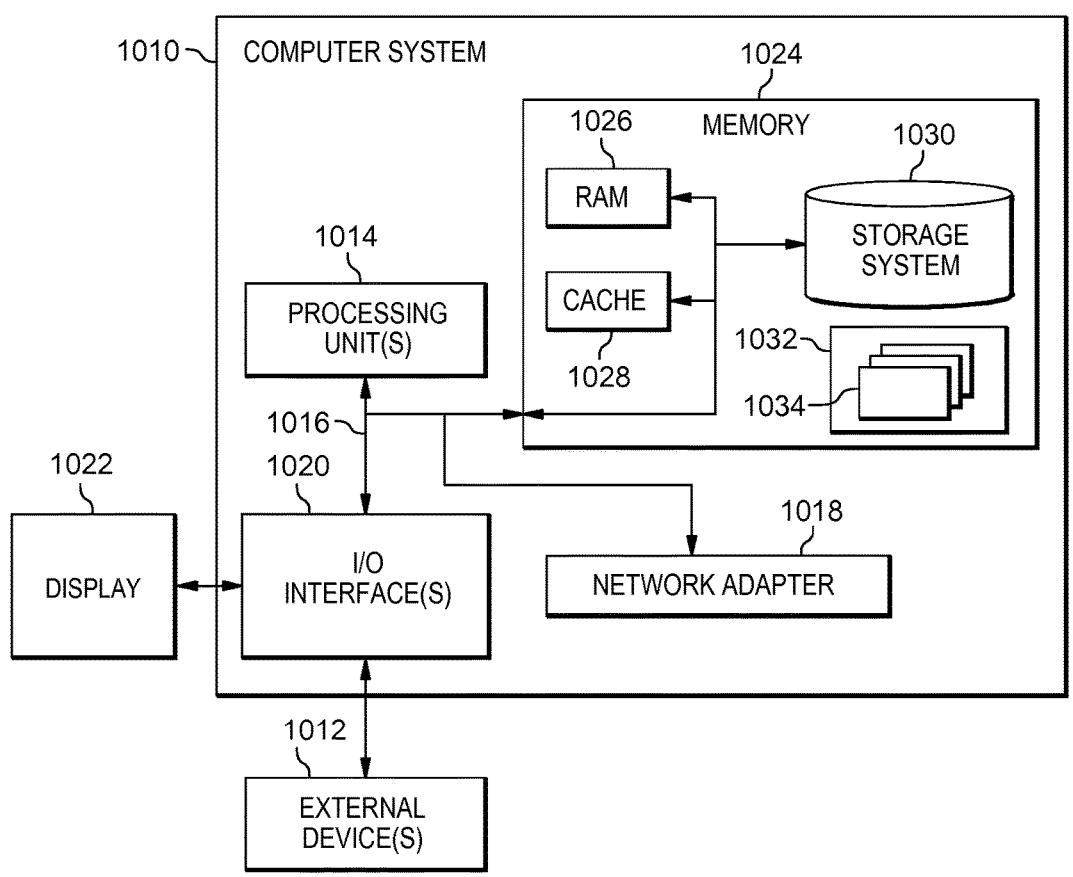
FIG. 10 is a block diagram of components of a data processing system, such as a proxy node of FIG. 2, in accordance with one embodiment of the present invention.

FIG. 10 is a block diagram depicting components of a data processing system, such as proxy node 1-$n$ of distributed object storage system 200, generally designated 1000, in accordance with an embodiment of the present invention. FIG. 10 provides only an illustration of one implementation and does not imply any limitations with regard to the environments in that different embodiments may be implemented. Many modifications to the depicted environment may be made.

In the illustrative embodiment, proxy node 1-$n$ in distributed object storage system 200 is shown in the form of a general-purpose computing device, such as computer system 1010. The components of computer system 1010 may include, but are not limited to, one or more processors or processing unit(s) 1014, memory 1024, and bus 1016 that couples various system components including memory 1024 to processing unit 1014.

Bus 1016 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 1010 typically includes a variety of computer system readable media. Such media may be any available media that is accessible by computer system 1010, and it includes both volatile and non-volatile media, removable and non-removable media.

Memory 1024 can include computer system readable media in the form of volatile memory, such as random access memory (RAM) 326 and/or cache memory 1028. Computer system 1010 may further include other removable/non-removable, volatile/non-volatile computer system storage media. By way of example only, storage system 1030 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 1016 by one or more data media interfaces. As will be further depicted and described below, memory 1024 may include at least one computer program product having a set (e.g., at least one) of program modules that are configured to carry out the functions of embodiments of the invention.

Program/utility 1032, having one or more sets of program modules 1034, may be stored in memory 1024 by way of example, and not limitation, as well as an operating system, one or more application programs, other program modules, and program data. Each of the operating systems, one or more application programs, other program modules, and program data, or some combination thereof, may include an implementation of a networking environment. Program modules 1034 generally carry out the functions and/or methodologies of embodiments of the invention as described herein. Computer system 1010 may also communicate with one or more external device(s) 1012 such as a keyboard, a pointing device, a display 1022, etc., or one or more devices that enable a user to interact with computer system 1010 and any devices (e.g., network card, modem, etc.) that enable computer system 1010 to communicate with one or more other computing devices. Such communication can occur via Input/Output (I/O) interface(s) 1020. Still yet, computer system 1010 can communicate with one or more networks such as a local area network (LAN), a general wide area network (WAN), and/or a public network (e.g., the Internet) via network adapter 1018. As depicted, network adapter 1018 communicates with the other components of computer system 1010 via bus 1016. It should be understood that although not shown, other hardware and software components, such as microcode, device drivers, redundant processing units, external disk drive arrays, RAID systems, tape drives, and data archival storage systems may be used in conjunction with computer system 1010.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiment of the present invention has been described with reference to the accompanying drawings. However, the present invention is not limited to the embodiment. The present invention can be carried out in forms to which various improvements, corrections, and modifications are added based on the knowledge of those skilled in the art without departing from the purpose of the present invention.

The invention claimed is:

1. A method for determining a storage to which to store a file in a storage system, the storage system including at least one server and at least two storages which can communicate with the at least one server through a communication network comprising the steps of:

obtaining, by one or more processors, a file name of a file to be stored in one of the at least two storages;

determining, by one or more computer processors, an effect of deduplication of data of the file based on the file name;

responsive to determining the effect of deduplication exists, selecting, by one or more computer processors, a length of characters of the file name, wherein the length of characters of the file name selected is selected by:

selecting, by one or more computer processors, a storage of the at least two storages;

calculating, by one or more computer processors, a deviation score of an amount of the selected storage that is in use;

comparing, by one or more computer processors, the deviation score with a threshold value to determine whether the amount of the selected storage used is greater than other storage of the at least two storages;

responsive to determining that the amount of the selected storage used is greater than other storage of the at least two storages, generating, by one or more computer processors, a list of a plurality of files stored in the selected storage;

finding, by one or more computer processors, at least two files of the plurality of files stored in the selected storage that has a prefix equal to a prefix of the file to be stored in one of the at least two storages; and selecting, by one or more computer processors, a length of characters of the file name of the file to be stored in one of the at least two storages that is longer than the prefix;

calculating, by one or more computer processors, a hash value using the length of characters of the file name; and determining, by one or more computer processors, a storage of the at least two storages to which to store the file based on the hash value.

2. The method according to claim 1, wherein the step of determining an effect of deduplication includes comparing, by one or more computer processors, the file name to information of a plurality of file names registered in a pre-defined filter, the information of the plurality of file names in the pre-defined filter having a high possibility that duplication of data may take place.

3. The method according to claim 2, wherein the information of the plurality of file names selected in the pre-defined filter includes at least one of an extension of a file, one or more first several characters of a file name, a header of a file, and an absolute path of a parent directory of a file.

4. The method according to claim 1, wherein the selected length of characters of the file name includes one or more first several characters having a predetermined length of the file name.

5. The method according to claim 4, wherein the one or more first several characters includes a character string from a head of the file name to a first punctuation mark.

6. The method according to claim 1, wherein the step of determining a storage to which to store the file includes using a table which defines one or more storages where each hash value is stored.

7. A storage system comprising:

at least one server; and at least two storages which can communicate with the at least one server through a communication network, wherein the server determines a storage to which to store a file in response to a write request of the file from a client by performing the steps of:

obtaining a file name of a file to be stored in a storage;

determining an effect of deduplication of data of the file based on the file name;

responsive to determining the effect of deduplication exists, selecting a length of characters of the file name, wherein the length of characters of the file name selected is selected by:

selecting, by one or more computer processors, a storage of the at least two storages;

calculating, by one or more computer processors, a deviation score of an amount of the selected storage that is in use;

comparing, by one or more computer processors, the deviation score with a threshold value to determine whether the amount of the selected storage used is greater than other storage of the at least two storages;

responsive to determining that the amount of the selected storage used is greater than other storage of the at least two storages, generating, by one or more computer processors, a list of a plurality of files stored in the selected storage;

finding, by one or more computer processors, at least two files of the plurality of files stored in the selected storage that has a prefix equal to a prefix of the file to be stored in one of the at least two storages; and selecting, by one or more computer processors, a length of characters of the file name of the file to be stored in one of the at least two storages that is longer than the prefix;

calculating a hash value using the length of characters of the file name; and determining a storage to which to store the file based on the hash value.

8. The storage system according to claim 7, wherein the step of determining an effect of deduplication includes comparing the file name to information of a plurality of file names registered in a pre-defined filter, the information of the plurality of file names in the pre-defined filter having a high possibility that duplication of data may take place.

9. The storage system according to claim 8, wherein the information of the plurality of file names selected in the pre-defined filter includes at least one of an extension of a file, one or more first several characters of a file name, a header of a file, and an absolute path of a parent directory of a file.

10. The storage system according to claim 7, wherein the selected length of characters of the file name includes one or more first several characters having a predetermined length of the file name.

11. The storage system according to claim 10, wherein the one or more first several characters includes a character string from a head of the file name to a first punctuation mark.

12. The storage system according to claim 7, wherein the step of determining a storage to which to store the file includes using a table which defines one or more storages where each hash value is stored.

13. The storage system according to claim 7, wherein at least one server includes a proxy server and a storage server, the proxy server performs each of the steps, and the storage server stores the file in the storage determined by the proxy server.

14. A computer program product for determining a storage to which to store a file in a storage system including at least one server and at least two storages which can communicate with the at least one server through a communication network, the computer program product comprising:
one or more computer readable storage media and program instructions stored on the one or more computer readable storage media, the stored program instructions comprising:
program instructions to obtain a file name of a file to be stored in a storage:
program instructions to determine an effect of deduplication of data of the file based on the file name;
responsive to determining the effect of deduplication exists, program instructions to select a length of characters of the file name, wherein the program instructions to select the length of characters of the file name comprise:
program instructions to select a storage of the at least two storages;
program instructions to calculate a deviation score of an amount of the selected storage that is in use;
program instructions to compare the deviation score with a threshold value to determine whether the amount of the selected storage used is greater than other storage of the at least two storages;
responsive to the program instructions to determine that the amount of the selected storage used is greater than other storage of the at least two storages, program instructions to generate a list of a plurality of files stored in the selected storage;
program instructions to find at least two files of the plurality of files stored in the selected storage that has a prefix equal to a prefix of the file to be stored in one of the at least two storages; and
program instructions to select a length of characters of the file name of the file to be stored in one of the at least two storages that is longer than the prefix;
program instructions to calculate a hash value using the length of characters of the file name; and
program instructions to determine a storage to which to store the file based on the hash value.

15. The computer program product according to claim 14, wherein the program instructions to determine an effect of deduplication includes program instructions to compare the file name to information of a plurality of file names registered in a pre-defined filter, the information of the plurality of file names in the pre-defined filter having a high possibility that duplication of data may take place.

16. The computer program product according to claim 15, wherein the information of the plurality of file names selected in the pre-defined filter includes at least one of an extension of a file, one or more first several characters of a file name, a header of a file, and an absolute path of a parent directory of a file.

* * * * *